(12) United States Patent
Kitagawa

(10) Patent No.: US 9,690,319 B2
(45) Date of Patent: Jun. 27, 2017

(54) SEMICONDUCTOR DEVICE

(71) Applicant: Kabushiki Kaisha Toshiba, Minato-Ku, Tokyo (JP)

(72) Inventor: Nobutaka Kitagawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/065,591

(22) Filed: Mar. 9, 2016

(65) Prior Publication Data
US 2017/0060171 A1 Mar. 2, 2017

(30) Foreign Application Priority Data

Aug. 27, 2015 (JP) ................................. 2015-167558

(51) Int. Cl.
*H04L 7/00* (2006.01)
*G06F 1/04* (2006.01)

(52) U.S. Cl.
CPC ....................................... *G06F 1/04* (2013.01)

(58) Field of Classification Search
CPC ........................................................ G06F 1/04
USPC ............................ 375/371; 327/291; 324/617
See application file for complete search history.

(56) References Cited

U.S. PATENT DOCUMENTS

| | | | |
|---|---|---|---|
| 6,374,361 B1 | 4/2002 | Lee et al. | |
| 7,644,296 B1 | 1/2010 | Burney | |
| 8,860,475 B1 | 10/2014 | Yeoh et al. | |
| 9,059,837 B1 * | 6/2015 | Tsunoda | ................. H04L 7/033 |
| 9,413,364 B2 * | 8/2016 | Li | ........................... H03L 7/091 |
| 2004/0104753 A1 * | 6/2004 | Haraguchi | ............... G06F 1/08 327/291 |
| 2004/0135604 A1 | 7/2004 | Lee | |
| 2008/0012576 A1 * | 1/2008 | Sato | ................ G01R 31/31937 324/617 |

FOREIGN PATENT DOCUMENTS

JP          2008-199156 A       8/2008

OTHER PUBLICATIONS

"Arriva V Device Handbook, vol. 1: Device Interfaces and Integration," Section 6, p. 3 (pp. 173/1872), Figure 6-6:LVDS SERDES, 2014, http://www.altera.co.jp/litetature/hb/arria-v/arriav_handbook.pdf.

* cited by examiner

*Primary Examiner* — Daniel Washburn
*Assistant Examiner* — Fitwi Hailegiorgis
(74) *Attorney, Agent, or Firm* — White & Case LLP

(57) ABSTRACT

According to one embodiment, a semiconductor device includes: a clock generation circuit configured to receive a first clock signal and to generate a second clock signal from the first clock signal; a first phase adjustment circuit configured to generate a first control signal using the first clock signal and the second clock signal; and a second phase adjustment circuit configured to receive data and to add a first delay value based on the first control signal to the data.

19 Claims, 8 Drawing Sheets

SEMICONDUCTOR DEVICE

CROSS-REFERENCE TO RELATED APPLICATIONS

This application is based upon and claims the benefit of priority from Japanese Patent Application No. 2015-167558, filed Aug. 27, 2015, the entire contents of which are incorporated herein by reference.

FIELD

Embodiments described herein relate generally to a semiconductor device.

BACKGROUND

For semiconductor devices, increased speed and reduced power consumption have been promoted. Accordingly, various techniques have been proposed which relate to data transfer between semiconductor devices and an I/O circuit for a semiconductor device.

DETAILED DESCRIPTION

Figure 1:
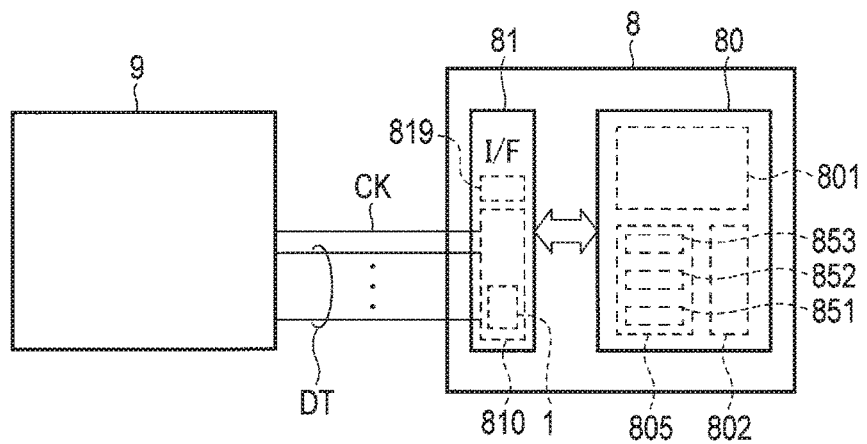
FIG. 1 is a schematic diagram of a system including a semiconductor device in an embodiment.

In general, according to one embodiment, a semiconductor device includes a clock generation circuit configured to receive a first clock signal and to generate a second clock signal from the first clock signal; a first phase adjustment circuit configured to generate a first control signal using the first clock signal and the second clock signal; and a second phase adjustment circuit configured to receive data and to add a first delay value based on the first control signal to the data.

The present embodiments will be described below with reference to the drawings. Components having the same functions and configurations are hereinafter denoted by the same reference numerals.

EMBODIMENTS

Semiconductor devices in the embodiments will be described with reference to FIGS. 1 to 11.

(1) First Embodiment

The semiconductor device in the first embodiment will be described with reference to FIGS. 1 to 8.

(a) Configuration

FIG. 1 is a diagram depicting a general configuration of a semiconductor system including the semiconductor device in the first embodiment.

As depicted in FIG. 1, the semiconductor system (or a semiconductor circuit) includes a first device 8 and a second device 9 (semiconductor integrated circuits).

Each of the first and second semiconductor devices 8 and 9 is a system LSI, for example, an SOC (System on Chip) device, or an IC (integrated circuit) including a low voltage differential signaling transmitter and/or receiver. Data DT and various signals are transmitted and received between the first semiconductor device 8 and the second semiconductor device 9. The data DT transmitted and received between the semiconductor devices 8 and 9 is, for example, image (moving image or still image) data, voice data, data that allows the semiconductor devices to be controlled, and the like.

The first semiconductor device 8 includes, for example, a core circuit 80, an interface circuit 81 and the like.

In the first semiconductor device 8, the core circuit 80 includes, for example, a plurality of circuit blocks 801 and 802.

The circuit blocks 801 and 802 are a processing circuit 801, a memory circuit 802, and the like.

The processing circuit 801 processes data in the memory circuit 802 or data and signals from the other semiconductor device 9. The memory circuit 802 temporarily holds data. The memory circuit 802 includes, for example, at least one of an SRAM, a DRAM and the like.

The core circuit 80 includes a programmable logic circuit (also referred to as a gate array circuit or a structured circuit) 805.

The programmable logic circuit 805 is a circuit that enables a circuit to be configured or reconfigured based on design information on the circuit provided by a user after a chip is manufactured.

The programmable logic circuit 805 includes a logic gate block (or gate array block) 851, a connection/switch block 852 and the like.

The logic gate block 851 includes a plurality of logic crates (logic elements) or a Plurality of transistors. The connection/switch block 852 includes a plurality of interconnects and a plurality of switch elements.

The programmable logic circuit 805 may include a retention block (memory block) 853. The memory block 853 holds design information (for example, a lookup table) that allows configuration of a circuit with a certain function. The memory circuit 802 may be used to hold the design information.

Based on the design information, the switch elements in the connection/switch block 852 are controllably turned on and off. The switch elements in an on state allow a plurality of logic gates such as NAND gates and OR gates in the logic gate block 851 to be connected together via interconnects in the connection/switch block 852. The switch elements in an off state allow the logic gates to be separated from one another.

Thus, in the semiconductor device in the present embodiment, the connections among the logic gates are controlled based on the design information to allow the programmable logic circuit 805 to configure a circuit that can execute a logic process or function desired by the user after the chip for the semiconductor device is manufactured.

The core circuit 80 as a whole may be the programmable logic circuit 805.

In the semiconductor device 8, an interface circuit (I/F circuit) 81 controls transfer of signals or data based on interface specifications for the semiconductor system and the semiconductor device.

The interface circuit 81 includes an input circuit 810.

The input circuit 810 receives data and signals based on the interface specifications for the system. For example, the input circuit 810 receives signals or data in accordance with a source synchronous LVDS (Low Voltage Differential Signaling) scheme.

When the semiconductor device 8 receives a signal or data from the semiconductor device 9, a clock signal (hereinafter referred to as an external clock signal) CK from the transmitting device 9 is supplied to the input circuit 810 of the receiving device 8 simultaneously with reception of the signal (data) from the transmitting device 9. The external clock signal CK need not necessarily be supplied by the transmitting device 9 but may be supplied by another device (for example, a controller) in the semiconductor system.

The system including the semiconductor device 8 desires to allow the receiving device 8 to absorb any deviation between timings (delay) to transmit and receive a signal which may occur in a transmission path between the two devices 8 and 9 due to input and output of the signal using differential transmission, such as the source synchronous LVDS scheme.

The input circuit 810 includes at least one phase control circuit (also referred to as a delay control circuit or a data reception circuit) 1 as a reception section for signals or data.

The phase control circuit 1 adjusts misalignment between the phases of the clock signal and a signal (data) which may occur between the transmitting device and the receiving device. Such control performed by the phase control circuit 1 enables the semiconductor device 8 to suppress jitters, skews, and the like that may occur during data transfer.

The interface circuit 81 may include, in addition to the input circuit 810, a circuit 819 such as a control circuit (interface processing circuit) and/or an output circuit.

Figure 2:
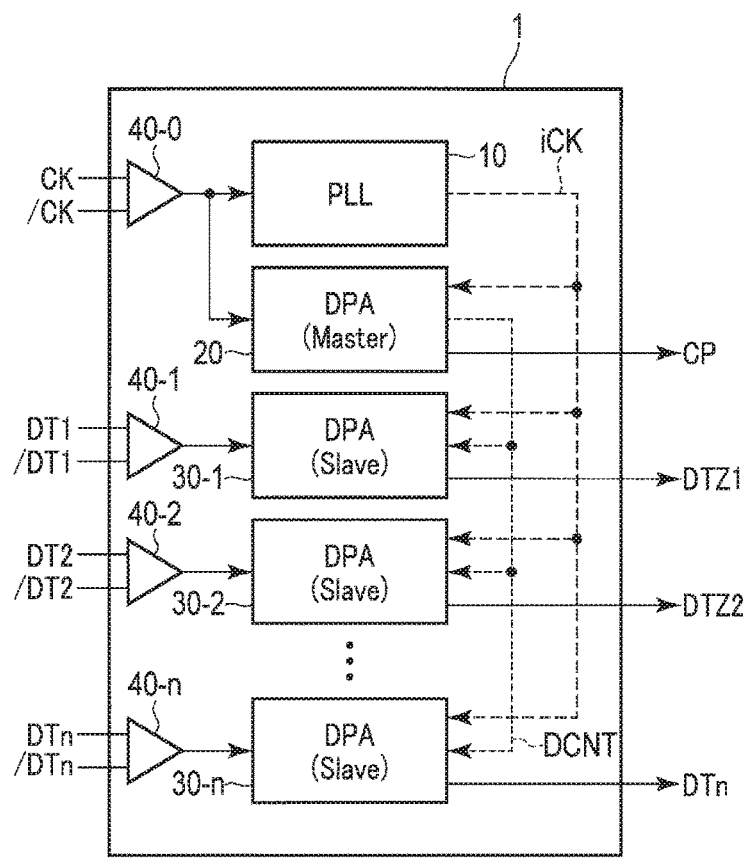
FIG. 2, FIG. 3, FIG. 4 and FIG. 5 are diagrams showing a configuration example of a semiconductor device in a first embodiment.

FIG. 2 is a diagram illustrating a configuration example of the phase control circuit included in the semiconductor device in the present embodiment.

As depicted in FIG. 2, in the present embodiment, the phase control circuit 1 includes a plurality of buffers 40, a clock generation circuit 10, and a plurality of phase adjustment circuits 20, 30-1, 30-2, and 30-*n*.

The phase control circuit 1 receives data transmitted by the semiconductor device 9.

The buffers 40 (40-0, 40-1, 40-2, and 40-*n*) receive the clock signal CK or the data DT (DT1, DT2, and DTn) from the transmitting semiconductor device 9.

The signal CK, DT from the transmitting device 9 is input to one of two input terminals of the LVDC-based buffer 40, a differential signal (inverted signal) /CK or /DT (/DT1, /DT2, and DTn) of the signal CK, DT input to the above-described input terminal is input to the other input terminal.

Signals output from the buffer 40 are supplied to the clock generation circuit 10 and the phase adjustment circuits 20, 30-1, 30-2, and 30-*n*, which correspond to the buffers 40-0, 40-1, 40-2, and 40-*n*, respectively.

The clock generation circuit 10 is a PLL (Phase Locked Loop) circuit.

The PLL circuit 10 generates a clock signal (hereinafter referred to as an internal clock signal) iCK used inside the semiconductor device 8. The PLL circuit 10 uses the external clock signal CK as a reference clock to generate an internal clock signal iCK used by the receiving semiconductor device 8. The internal clock signal iCK generated by the PLL circuit 10 is a clock signal with a frequency resulting from multiplication of a frequency of the external clock signal CK. The external clock signal CK is supplied to the semiconductor device 8 along with data. For example, the internal clock signal iCK is a sampling clock that serves as a reference for a timing for data sampling.

The internal clock signal iCK from the PLL circuit 10 is supplied to the phase adjustment circuits 20, 30-1, 30-2, and 30-*n* and the core circuit 80.

In the present embodiment, as the clock signal generated by the PLL circuit. 10, the one clock signal iCK is representatively illustrated. However, the PLL circuit 10 may use the external clock signal as a reference clock signal to generate a plurality of clock signals used by circuits in the semiconductor device 8. For example, the PLL circuit 10 can supply, to another circuit, an inverted clock signal of the internal clock signal iCK (hereinafter referred to as the auxiliary clock), a clock signal having a phase different from the phase of the internal clock signal iCK, and the like.

The phase adjustment circuits 20, 30-1, 30-2, and 30-*n* adjust the phase of the externally supplied signal (data) CK, DT so as to allow the signal (or data) OK or DT to be received at a timing synchronized with the internal clock signal iCK. Each of the phase adjustment circuits 20, 30-1, 30-2, and 30-*n* receives the signal and outputs the received signal to the core circuit 80.

In the present embodiment, the phase adjustment circuits 20, 30-1, 30-2, and 30-*n* are DPA (Dynamic Phase Alignment) circuit.

At the time of reception (sampling) of the signal, the DPA circuits 20, 30-1, 30-2, and 30-*n* execute dynamically an adjustment (a control of a delay in the signal) of the phase of the signal (the signal from the buffer 40) to be received.

In the present embodiment, the circuit 20, one of the DPA circuits included in the phase control circuit 1, is a master DPA circuit, and the remaining circuits 30-1, 30-2, and 30-*n* are slave DPA circuits.

For example, a plurality of (n) slave DPA circuits 30-2, and 30-*n* are provided in the phase control circuit 1. The number of the slave DPA circuits 30-1, 30-2, and 30-*n* depends on the number of channels allocated to one phase control circuit 1 (the number of data lines). The slave DPA circuits 30-1, 30-2, and 30-*n*, when not distinguished from one another, are represented as the slave DPA circuit 30.

In the present embodiment, the master DPA circuit 20 outputs a control signal DCNT that allows operations of the slave DPA circuit 30 to be controlled.

The master DPA circuit 20 is connected to the buffer 40-0, which is common to the PLL circuit 10. The master DPA circuit 20 receives the external clock signal CK, which is common to the PLD circuit 10, as a reference signal used for phase matching when the signal or data is received. The master DPA circuit 20 generates the control signal DCNT for the slave DPA circuit 30.

The slave DPA circuit 30 adjusts the phase of the signal (input data) to be received with respect to the internal clock signal iCK based on the control signal DCNT from the master DPA circuit 20.

The signals CK, DT to be received (sampled) by the DPA circuits 20 and 30 are serially input. The DPA circuits 20 and 30 adjust the phases of the input signals and convert the serial signals into parallel signals. The DPA circuits 20 and 30 output the parallel signals to the core circuit 80.

The phases of the data DT1, DT2, and DTn input to the slave DPA circuits 30-1, 30-2, and 30-*n* are aligned with one another. Differences, in phase, of the data DT1, DT2, and DTn from the clock signals iCK and CK are of the same magnitude among the slave DPA circuits 30-1, 30-2, and 30-n.

Figure 3:
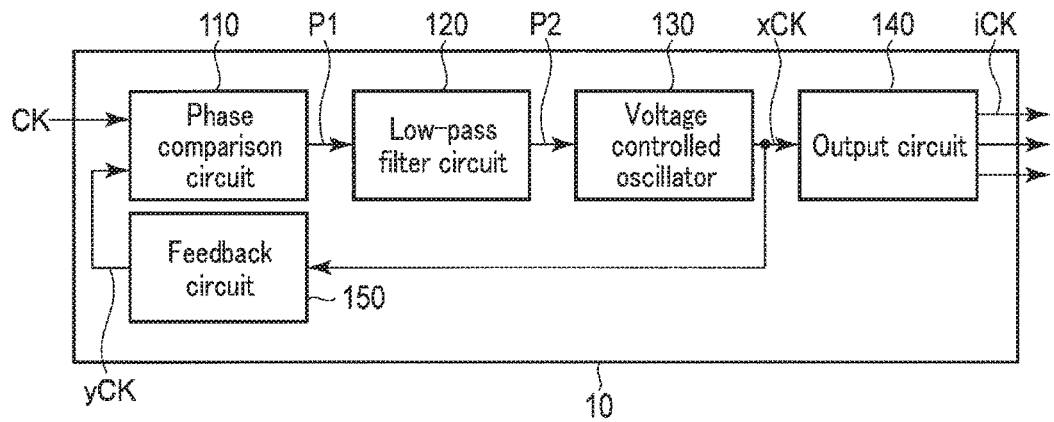
Figure 4:
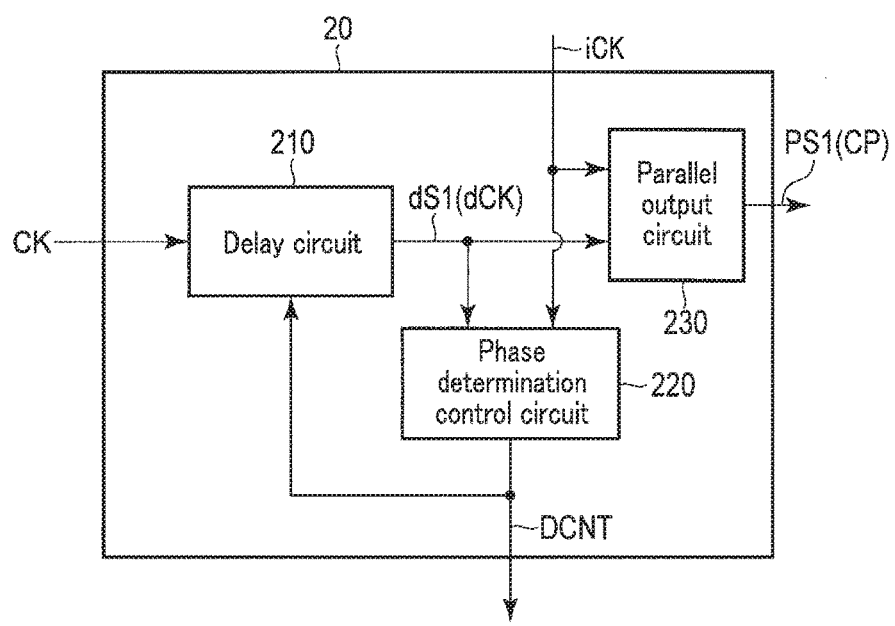
Figure 5:
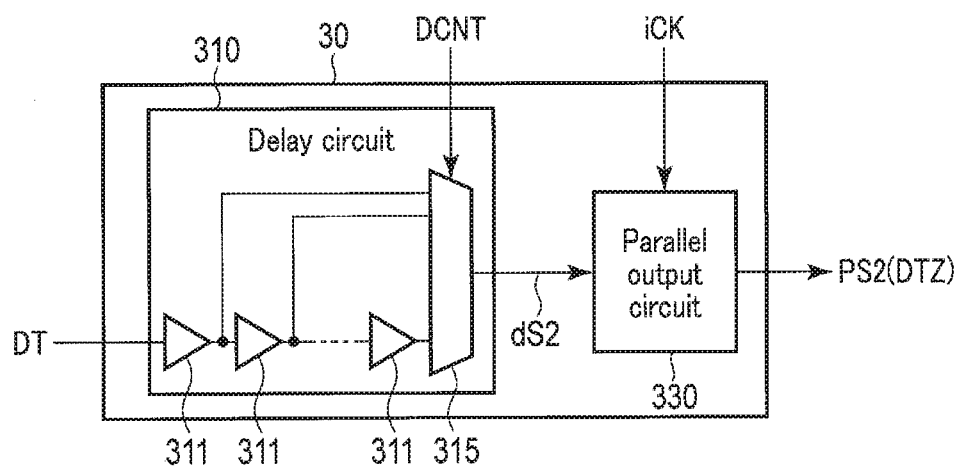

With reference to FIGS. 3 to 5, an internal configuration of components of the phase control circuit in the present embodiment will be specifically described.

FIG. 3 is a block diagram depicting an example of an internal configuration of the PLL circuit.

The PLL circuit 10 includes at least a phase comparison circuit 110, a low-pass filter (LPF) circuit 120, a voltage controlled oscillator (VCO) 130, a feedback circuit 150, and an output circuit 140.

The phase comparison circuit 110 compares the external clock signal (reference clock signal) CK from the buffer 40 with a signal (clock signal) yCK from the feedback circuit 150. Based on the result of the comparison between the external clock signal CK and the signal yCK, the phase comparison circuit 110 detects a phase difference between the external clock signal CK and the signal yCK. The phase comparison circuit 110 outputs the signal P1 based on the phase difference between the signal CK and the signal yCK, to the low-pass filter circuit 120.

The low-pass filter circuit 120 removes AC components (ripples) and noise from the signal P1 from the phase comparison circuit 110. The low-pass filter circuit 120 outputs a signal (DC signal) P2 to the voltage controlled oscillator 130.

The low-pass filter circuit 120 includes a transfer function that allows transfer characteristics of the PLL circuit 10 to be determined. Stability of loop control in the PLL circuit 10 is based on the transfer function of the low-pass filter circuit 120.

The voltage controlled oscillator 130 outputs an oscillation signal in accordance with the signal P2 from the low-pass filter circuit 120. That is, the voltage controlled oscillator 130 can output a signal xCK with a certain frequency using an input DC signal P2 as a control signal. For example, the clock signal xCK output by the voltage controlled oscillator 130 has a frequency resulting from multiplication, by N (N is a natural number), of the frequency of the external clock signal CK input to the PLL circuit 10.

The output signal xCK from the voltage controlled oscillator 130 is supplied to the output circuit 140 and the feedback circuit 150.

The output circuit 140 supplies the output signal xCK from the voltage controlled oscillator 130 to the DPA circuits 20, 30-1, 30-2, and 30-n and the core circuit 80 as the internal clock signal iCK. The output circuit 140 can output, for example, an auxiliary clock signal based on the output signal xCK besides the internal clock signal iCK.

The feedback circuit 150 feeds back the output signal xCK from the voltage controlled oscillator 130, to the phase comparison circuit 110.

The feedback circuit 150 includes, for example, a frequency divider. The feedback circuit 150 multiplies the frequency of the clock signal CK by 1/N. Thus, the feedback circuit 150 supplies a clock signal (a clock signal with a frequency resulting from frequency division) having the same frequency as the clock frequency (period) of the external clock signal CK to the Phase comparison circuit 110.

As described above, the PLL circuit 10 generates the internal clock signal iCK using the external clock signal CK as a reference clock signal. The internal clock signal iCK has a frequency resulting from multiplication of the frequency of the external clock signal CK by N. In the present embodiment, the internal clock signal iCK is a clock signal having a frequency that is two multiplied the frequency of the external clock signal CK.

FIGS. 4 and 5 are block diagrams depicting examples of internal configurations of the DPA circuits.

FIG. 4 depicts a configuration example of the master DPA circuit 20. FIG. 5 depicts a configuration example of the slave DPA circuit 30.

As depicted in FIG. 4, the master DPA circuit 20 includes a delay circuit 210, a phase determination control circuit 220, and a parallel output circuit 230.

The delay circuit 210 adds a delay value dd1 of a certain magnitude to the serial input signal CK supplied via the LVDS buffer 40. Adding the delay value to the input signal CK adjusts the phase of the input signal CK with respect to the internal clock signal iCK.

In the present embodiment, the serial input signal CK supplied to the delay circuit 210 in the master DPA circuit 20 is the external clock signal CK, which is the same as the reference clock signal in the PLL circuit 10. The magnitude of the delay value dd1 of the delay circuit 210 is sequentially controlled by the control signal DCNT described below during the period of reception of the data DT.

The delay circuit 210 outputs an input signal dS1 (dCK) with the delay value dd1 added thereto (hereinafter referred to as a delay signal) to the phase determination control circuit 220 and the parallel output circuit 230.

The phase determination control circuit 220 receives the delay signal dS1 and the output signal (internal clock) iCK from the PLL circuit 10.

Based on the internal clock signal iCK and the delay signal dS1, the phase determination control circuit 220 determines the phase of the internal clock signal iCK and the phase of the external clock signal CK with the delay value dd1 added thereto. The phase determination control circuit 220 detects a phase difference between the internal clock signal iCK and the external clock signal CK. Based on the result of the determination and the result of the detection, the phase determination control circuit 220 generates the desired delay control signal DCNT.

Thus, the phase determination control circuit 220 controls the value of the delay control signal DCNT (the magnitude of the delay value to be added) so as to stabilize timings for signal sampling performed by the DPA circuits 20 and 30. The delay control signal DCNT is a signal with a certain number of bits corresponding to a variable range of the delay value. The value of the delay control signal DCNT is variable during reception of data.

The phase determination control circuit 220 outputs the generated delay control signal DCNT to the plurality of slave DPA circuits 30.

The phase determination control circuit 220 also outputs the delay control signal DCNT to the delay circuit 210. The delay value dd1 of the delay circuit 210 is adjusted by the delay control signal DCNT from the phase determination control circuit 220. The delay value of the DPA circuit 20 (the amount of phase shift) is converged to a value appropriate for data reception (sampling) by repeating the determination process using the external clock signal dCK with a certain delay value dd1 added thereto and the internal clock signal iCK.

The parallel output circuit 230 converts the supplied delay signal (serial input signal) dS1 into a parallel signal. The parallel output circuit 230 outputs a parallel output signal PS1 at a timing based on the internal clock signal iCK.

The master DPA circuit 20 outputs the delayed clock signal dCK to the exterior of the master DPA circuit 20 as the parallel output signal PS1. The output signal PS1 from the master DPA circuit 20 is supplied to the subsequent circuit (for example, the core circuit 80) by the master DPA circuit 20. For example, the output signal PS1 can be utilized as check data CP that allows the state of data reception or the operational status of the circuit to be known.

As described above, in the phase control circuit 1 in the present embodiment, the signal supplied to the master DPA circuit 20 (serial input signal) is the external clock signal (the reference clock signal supplied to the PLL circuit 10) CK.

In the present embodiment, the external clock signal CK is used as training data for the DPA circuit 20. For a training operation of the DPA circuit using the clock signal CK as training data, the master DPA circuit 20 determines, within a certain period (an initialization period or a training period), an initial value for the delay control signal (phase adjustment signal) DCNT for the start of reception of the data DT.

Using the external clock signal CK as training data allows the DPA circuits 20 and 30 used as phase control circuits in the present embodiment to execute a training process for the DPA circuit in a pattern in which switching between "0 (Low)" and "1 (High)" occurs frequently during a certain period (for example, the pattern is referred to as a pattern with the highest frequency).

Thus, in the present embodiment, the phase determination control circuit 220 in the master DPA circuit 20 executes the process of determining the phase using the internal clock signal iCK and the external clock signal CK (dSK) with the delay value dd1 added thereto, to control the value of the delay control signal DCNT (the delay value in the slave DPA circuit).

In the present embodiment, instead of being used to receive data, the master DPA circuit 20 constantly receives the external clock signal CK during the period of data reception to monitor the phase difference between the external clock signal CK (the external clock signal to which the delay value is added) and the internal clock signal iCK.

Consequently, the master DPA circuit 20 can continuously correct the delay value of the DPA circuit for the phase difference of the clock signal or data during data transfer between the devices in parallel with data reception (sampling).

As a result, in the semiconductor device 8 in the present embodiment, the receiving phase control circuit 1 can adjust the phase of the data to be received (can control the delay) such that the adjustment appropriately tracks a fluctuation in the phase of the external clock signal or data transmitted by the transmitting device.

As depicted in FIG. 5, the slave DPA circuit 30 includes a delay circuit 310 and a parallel output circuit 330.

The delay circuit 310 adds a delay value (the amount of phase shift) dd2 to the serial input signal (data) DT based on the delay control signal DCNT from the master DPA circuit 20. The magnitude of the delay value dd2 depends on the value indicated by the delay control signal DCNT.

The delay circuit 310 outputs, to the parallel output circuit 330, an input signal (delay signal) dS2 with the delay value dd2 based on the delay control signal DCNT added thereto.

For example, the delay circuit 310 includes a configuration with a plurality of buffers 311 connected together in series. An output terminal of each of the buffers 311 is connected to an input terminal of the subsequent buffer and to a selector 315.

The delay value dd2 added to the input signal DT is adjusted according to the number of the buffers 311 via which the signal DT is transmitted.

The selector 315 selects one of the outputs (signal paths) from the buffers 311 based on the delay control signal DCNT. Thus, the delay circuit 310 outputs the signal (delay signal) dS2 to which the delay value dd2 corresponding to the delay control signal DCNT is added.

Thus, the delay value dd2 corresponding to the number of the buffers 311 through which the signal DT passes is added to the input signal DT to generate the delay signal dS2 in the slave DPA circuit 30.

For example, the delay circuit 210 in the master DPA circuit 20 also has substantially the same configuration as that of the delay circuit 310 in the slave DPA circuit 30.

The parallel output circuit 330 converts the delay signal dS1, which is a serial signal, into the parallel signal PS2. The parallel output circuit 330 outputs the parallel output signal PS2 (the output data DTZ) to the exterior of the slave DPA circuit 30 at a timing based on the internal clock signal iCK.

In present embodiment, based on the control signal DCNT from the master DPA circuit 20, the slave DPA circuit 30 changes the delay value dd2 added to the data DT during the reception of the data DT and adjusts the phase of the input data (the data from the transmitting device) DT with respect to the internal clock signal iCK.

In the present embodiment, no trailing process is executed on the slave DPA circuit 30. After passage of period provided for stabilization of the output from the PLL circuit and for the training operation for the master DPA circuit 20, the slave DPA circuit 30 can receive (sample) the data DT without a training operation for the slave DPA circuit 30.

(b) Operation Example

Figure 6:
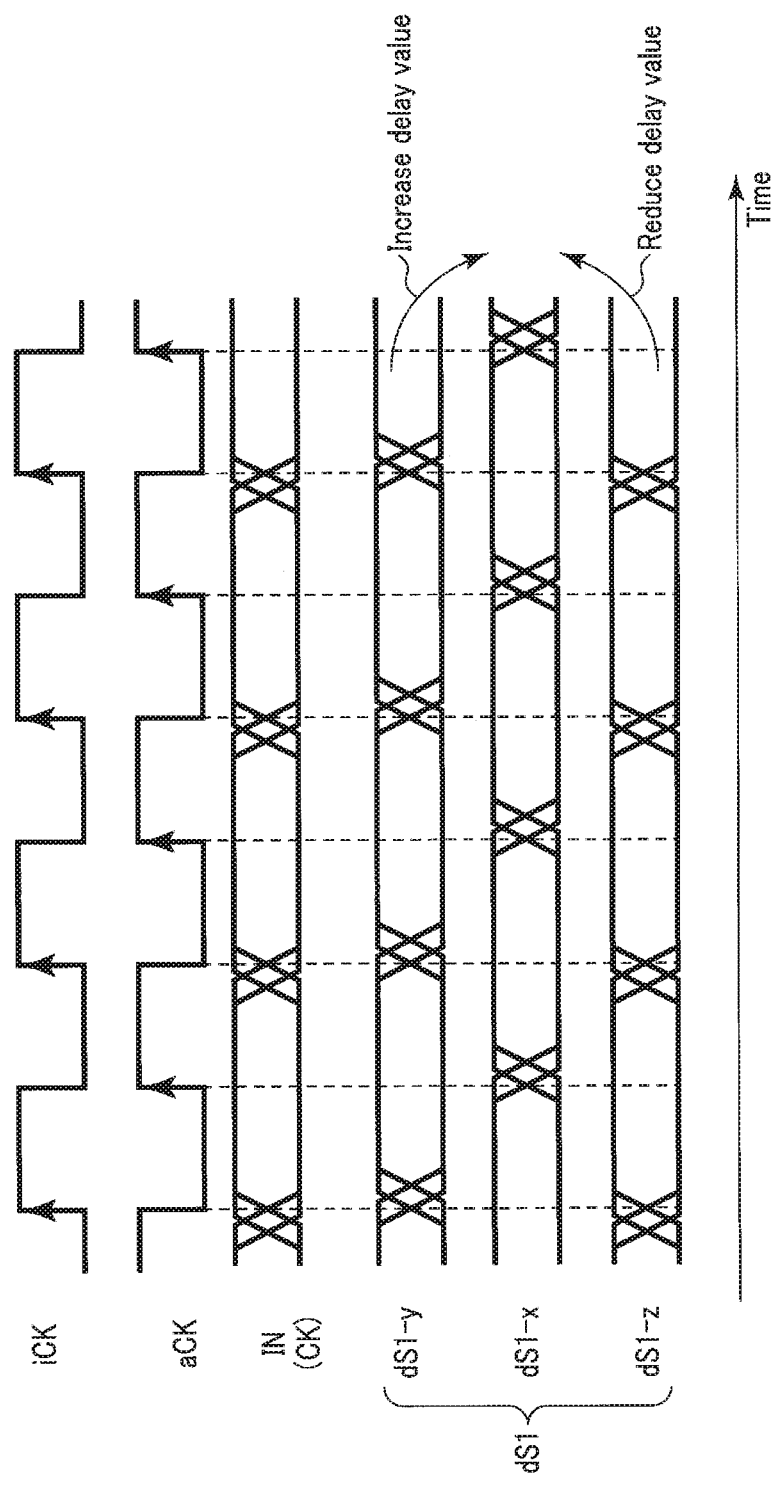
FIG. 6, FIG. 7, and FIG. 8 are timing charts illustrating an operation example of the semiconductor device in the first embodiment.
Figure 7:
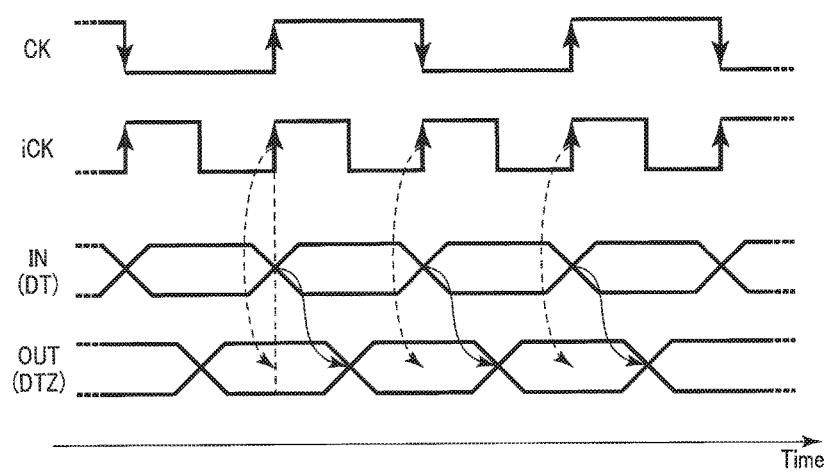
Figure 8:
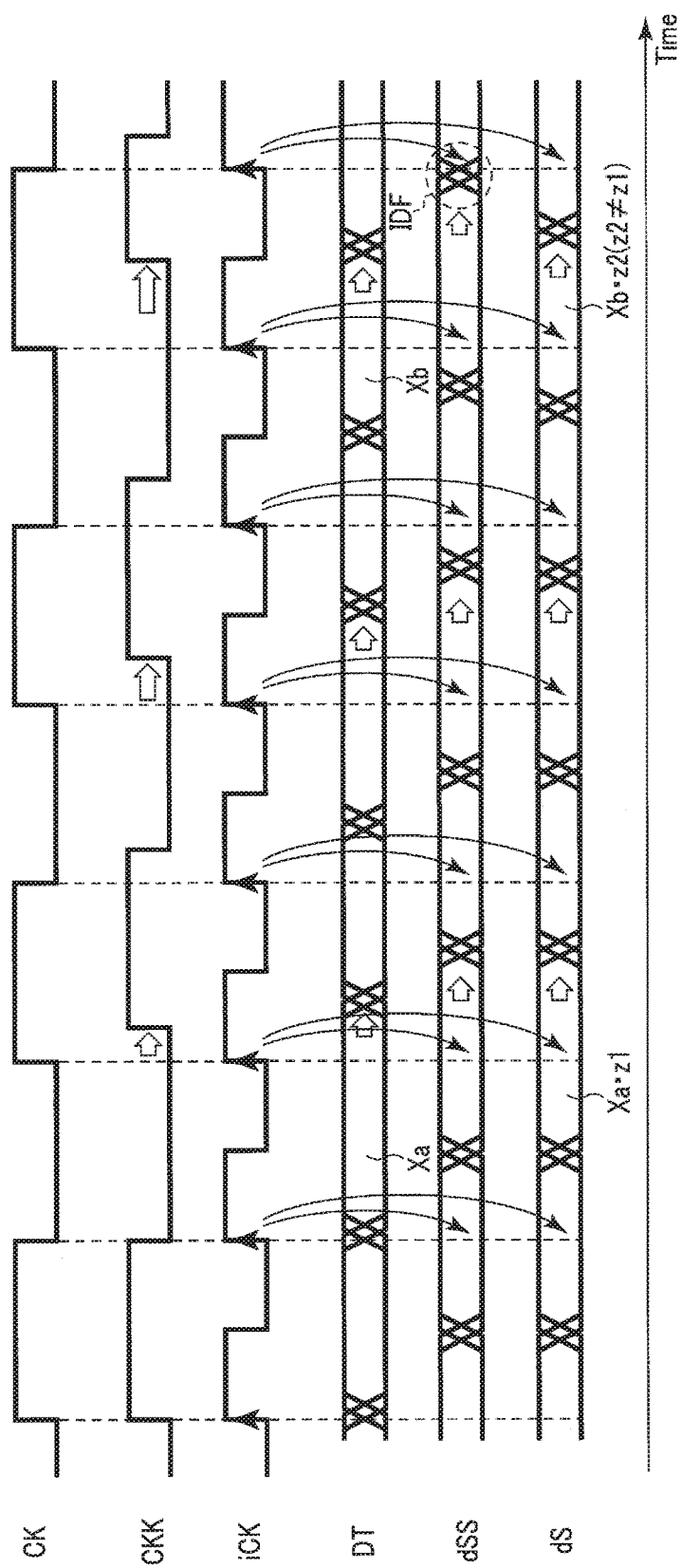

With reference to FIGS. 6 to 8, an example of operation (control method) of the semiconductor device in the first embodiment will be described. Using FIGS. 1 to 5 as needed in addition to FIGS. 6 to 8, the operation example of the semiconductor device in the embodiment will be described.

Data transfer is started between the two semiconductor devices 8 and 9.

The data (signal) DT to be processed by the semiconductor device. 8 is transmitted from the transmitting semiconductor device 9 to the receiving semiconductor device 8. Along with the data DT, the clock signal (external clock signal) CK from the transmitting semiconductor device 9 is supplied to the receiving semiconductor device 8.

Before the data DT is received from the semiconductor device 9, the PLL circuit 9 and the master DPA circuit 20 perform an operation described below during the period provided to stabilize the output from the PLL circuit 10 and the training operation for the master DPA circuit 20 (the period is hereinafter referred to as the initialization period.).

Before the receiving semiconductor device 8 receives (samples) the data DT, an operation of initializing the phase control circuit 1 in the semiconductor device 8 is performed under the control of the core circuit 80 or the control of a controller (not depicted in the drawings) in the semiconductor system in order to generate the internal clock signal iCK and to determine an initial value for the delay control signal DCNT.

During the initialization period for an execution of the initialization operation, the PLL circuit 10 performs control for generation or adjustment of the internal clock signal iCK so as to set the output from the PLL circuit 10 in a steady state (stable oscillation state).

As depicted in FIG. 2 and FIG. 3, the external clock signal CK from the transmitting semiconductor device 9 is supplied to the phase control circuit 1 in the receiving semiconductor device 8. The external clock signal CK is input to the PLL circuit 10 in the phase control circuit 1 via the buffer 40. The PLL circuit 10 uses the external clock signal CK as a reference clock signal to generate and adjust the internal clock signal iCK supplied to the DPA circuits 20 and 30.

The supply of the external clock signal CK allows the phase comparison circuit 110 to output the signal P1. The output signal P1 from the phase comparison circuit 110 is supplied to the voltage controlled oscillator 130 via the low pass filter circuit 120.

Based on the signal P2 output from the low-pass filter circuit 120, the signal xCK with a certain clock frequency is output from the voltage controlled oscillator 130.

The signal xCK is supplied to the feedback circuit 150. The signal yCK with a frequency resulting from frequency division by the feedback circuit 150 is supplied to the phase comparison circuit 110.

The signal yCK and the external clock signal CK are compared with each other by the phase comparison circuit 110. Based on the result of the comparison, the output signal P1 from the phase comparison circuit 110 is adjusted.

The adjusted output signal P1 is supplied to the voltage controlled oscillator 130 via the low-pass filter circuit 120. The signal xCK based on the adjusted output signal P1 (P2) is output from the voltage controlled oscillator 10.

During the initialization period, the internal clock signal iCK with a certain frequency is stabilized by a feedback process in the PLL circuit 10. The internal clock signal iCK in the steady state is output from the PLL circuit 10.

During the initialization period, the master DPA circuit 20 performs an operation described below within the period provided for the training operation for the DPA circuit 20 (training period).

In the present embodiment, as depicted in FIG. 2 and FIG. 4, the external clock signal (reference clock) CK is supplied to the master DPA circuit 20 in the phase control circuit 1 via the buffer 40.

During the initialization period, in parallel with generation or adjustment of the internal clock signal iCK by the PLL circuit 10, the operation of training the DPA circuit is started by the master DPA circuit 20 using the external clock signal CK as training data.

The training operation is performed to determine the initial value of the delay control signal DCNT (delay values dd1 and dd2). The initial value of the delay control signal DCNT is set by the training operation to suppress possible skews and jitters when the slave DPA circuit 30 starts receiving data.

In the present embodiment, the training operation for the DPA circuit 20 is performed using, as a training pattern (training data), a pattern such as the clock signal which involves frequent switching between an "0" level and a "1" level. Consequently, initialization of the DPA circuit (setting of the initial value) can be performed at a relatively high speed and a relatively high accuracy.

In the training operation, the delay value dd1 with a certain magnitude is added to the external clock signal CK by the delay circuit 210 in the master DPA circuit 20.

In the master DPA circuit 20, the signal with a certain delay value dd1 added thereto (the clock with the delay value added thereto) dS1 (dCK) and the clock signal iCK from the PLL circuit 10 are supplied to the phase determination control circuit 220.

In the present embodiment, an example of setting of the delay control signal DCNT, the phase determination control circuit 220 samples the external clock signal dCK with a certain delay value added thereto, at a timing based on the internal clock signal iCK.

Thus, the value of the delay control signal DCNT, that is, the delay value dd2 used in the slave DPA circuit 30 during reception of the data DT, is adjusted by the master DPA circuit 20.

FIG. 6 is a timing chart illustrating an example of operation of the phase determination control circuit in the phase control circuit in the semiconductor device in the present embodiment.

In FIG. 6, the axis of abscissas corresponds to time. The axis of ordinate corresponds to the signal levels of signals. In FIG. 6, for the delay signal (151 inside the master DPA circuit 20 (delay clock signal dCK), a signal dS1-x corresponds to the delay signal dS1 with the appropriate delay value added thereto. A signal dS1-y in FIG. 6 corresponds to the delay signal dS1 with a delay value smaller than the appropriate value. A signal dS1-z in FIG. 6 corresponds to the delay signal dS1 with a delay value larger than the appropriate value.

As depicted in FIG. 6, during the training period for the master DPA circuit 20, the phase determination control circuit 220 determines the phase of the external clock dS1 (dCK) with the delay value dd1 of a certain magnitude by sampling the delay signal dS1 at a rising edge and a falling edge of the internal clock signal iCK.

For example, sampling at the falling edge of the internal clock signal iCK is performed using a rising edge of an inverted signal (auxiliary clock signal) aCK of the internal clock signal iCK. In this case, the auxiliary clock signal aCK is supplied to the phase determination control circuit 220 along with the internal clock signal iCK. The phase of the auxiliary clock signal is shifted through 180° with respect to the phase of the internal clock signal iCK. A stable state of sampling of the delay signal dS1 in the phase determination control circuit 220 is a state where the value of the signal sampled by the phase determination control circuit 220 at the rising edge of the auxiliary clock signal aCK (sampling value) fluctuates.

By determining whether or not the timing to sample the delay signal dS1 is stable, the phase determination control circuit 220 adjusts the value of the delay control signal DCNT corresponding to the delay values dd1 and dd2.

As depicted in FIG. 6, for example, the center of an effective window of the external clock signal (the serial input signal to the master DPA circuit 20) CK aligns with the rising edge of the auxiliary clock signal aCK (the falling edge of the internal clock iCK).

A stable state of the input timing is such that, at the timing when the input signal IN(CK) is input to the master DPA circuit. 20, the center of the effective window of the external clock signal CK as the input signal aligns with the rising edge of the auxiliary clock signal aCK.

When the appropriate delay value dd1 is added to the external clock signal CK, as is the case with the delay signal dS1-x, the rising edge of the internal clock signal iCK aligns with the center of the effective window of the delay signal dS1-x supplied to the phase determination control circuit 220 (delayed external clock signal), and the rising edge of the auxiliary clock signal aCK (the falling edge of the internal clock signal iCK) aligns with the edge of the effective window of the delay signal dS1-x.

For sampling of the delay signal dS1 in the phase determination control circuit 220, at the timing when the center of the effective window of the delay signal dS1 aligns with the rising edge of the auxiliary clock signal aCK, the sampling value of the delay signal dS1 is stable (H level or L level), as is the case with the delay signals dS1-y and dS1-z.

On the other hand, when the edge of the effective window of the delay signal dS1 aligns with the rising edge of the auxiliary clock signal aCK, the sampled delay value dS1 is in an unstable state. At the timing for sampling of the delay signal dS1 in this case, the sampling value is an unstable value.

Thus, based on the sampling result (sampling value) for the delay signal dS1 with respect to the rising edge or falling edge of the internal clock signal iCK, the phase determination control circuit 220 determines whether or not the value of the delay control signal DCNT corresponding to the delay values dd1 and dd2 is appropriate.

Based on the determination result, the delay value dd1 is adjusted to stabilize the timing to sample the delay signal dS1, thus setting the delay control signal DCNT to the appropriate value. Based on the result of the sampling of the delay signal dS1 by the phase determination control circuit 220, the phase difference between the internal clock signal iCK and the external clock signal CK is equivalently determined to allow a more favorable value for the delay control signal DCNT to be determined.

For example, when the sampling result for the delay signal dS1 at the rising edge of the internal clock signal iCK is in the unstable state, and the sampling of the delay signal dS1 at the rising edge of the auxiliary clock signal aCK is in the stable state, as is the case with the delay signal dS1-y in FIG. 6, the phase determination control circuit 220 determines that the delay in the phase of the delay signal dS1-y is low.

In this case, to increase the delay in the input signal CK, the delay value dd1 is increased. The value of the delay control signal DCNT is updated to a larger value based on the last determination result.

For the delay signal dS1-z in FIG. 6, when, based on the sampling result for the delay signal dS1 at the rising edges of the internal clock signal iCK and the auxiliary clock signal aCK, the phase determination control circuit 220 determines that the phase of the delay signal dS1-z (dCK) is significantly delayed with respect to the internal clock signal iCK, the delay value dd1 is reduced to decrease the delay in the phase of the delay signal dS1-z.

Thus, the value of the delay control signal DCNT is updated to a smaller value based on the last determination result.

Based on the result of the determination using the internal clock signal iCK with respect to the delayed external clock signal dCK (the sampling result for the delayed clock signal dCK synchronized with the internal clock signal iCK), the value of the delay control signal DCNT (bit value) corresponding to the delay value dd1 and dd2 is counted up or down. As a result, the value of the delay control signal DCNT is adjusted.

The delay control signal DCNT adjusted based on the determination process is output from the phase determination control circuit 220 to the delay circuit 210.

The delay value dd1 corresponding to the adjusted delay control signal DCNT is added to the external clock signal CK serving as an input signal by the delay circuit 210. The delay signal dS1 with the adjusted delay value dd1 added thereto is supplied to the phase determination control circuit 220. The determination process on the delay signal dS1 is executed by the phase determination control circuit 220.

Based on the result of the determination performed by the phase determination control circuit 220 using the delayed clock signal CK and the internal clock signal iCK, the delay value is repeatedly adjusted during the training period for the master DPA circuit 20.

Consequently, during the training period, the value of the delay control signal DCNT converges to a certain value.

Based on the process of determining the delay value (phase shift amount) using the internal clock signal iCK and the clock signal dCK with the delay value dd1 added thereto as in the example illustrated in FIG. 6, the delay value dd1 is increased and reduced to adjust the value of the delay control signal DCNT (the delay value dd1 and dd2 of the DPA circuit).

As a result, during the training period for the master DPA circuit 20, the initial value of the delay control signal DCNT set at the time of data, sampling is determined.

The adjustment of the delay control signal DCNT (delay values dd1 and dd2) by the phase determination control circuit 220 as illustrated in FIG. 6 is an example. Another control method may be used to adjust the value of the delay control signal DCNT.

After the training operation (initialization operation) for the master DPA circuit 20 is completed, reception (sampling) of the data DT by the slave DPA circuit 30 is started.

As depicted in FIGS. 2 and 5, the data DT from the transmitting device 9 is supplied to the slave DPA circuit 30 via the LVDS buffer 40 as a, serial input signal. Sampling of the data DT by the slave DPA circuit 30 is started without the trailing operation for the slave DPA circuit 30.

In the present embodiment, the operation of the Phase determination control circuit depicted in FIG. 6 is continuously performed during the data sampling period for the slave DPA circuit 30.

FIG. 7 is a diagram illustrating an operation example of the phase control circuit (input circuit) in the semiconductor device in the present embodiment.

FIG. 7 is a timing chart illustrating a basic operation example of the phase control circuit during data sampling in the semiconductor device in the present embodiment.

In FIG. 7, the axis of abscissas corresponds to time, and the axis of ordinate corresponds to the signal levels of the signals.

As depicted in FIG. 7, data transfer in the semiconductor device in the present embodiment is performed in an edge align scheme.

During the data transfer based on the edge align scheme, with the phases of data (data with the delay value not added thereto) DT and the external clock signal CK aligned with each other, the input data is fed from the transmitting semiconductor device 9 to the receiving semiconductor device 8. The input data DT is input to the slave DPA circuit 30 in synchronism with the rising edge of the internal clock signal iCK. In this case, the center of the effective window of the input data DT aligns with the falling edge of the internal clock signal iCK.

When the slave DPA circuit 30 receives (samples) the data DT, the delay value dd2 based on the delay control signal DCNT from the master DPA circuit 20 is added to the input data DT by the delay circuit 310 in each of the slave DPA circuits 30. The delay value dd2 is added to every bit of signal included in the serial input signal serving as the input data DT.

For example, the delay value dd2 used in the slave DPA circuit 30 has substantially the same magnitude as that of the delay value dd1 used in the master DPA circuit 20.

The data (delay signal) dS2 with the delay value dd2 added thereto is supplied to the parallel output circuit 330.

The delay value dS2 is converted from the serial signal into a parallel signal by the parallel output circuit 330. Data DTZ converted into the parallel signal is output from the slave DPA circuit 30 by the parallel output circuit 330, and supplied to the subsequent circuit (for example, the core circuit 80, the programmable logic circuit 81, or the memory circuit).

For the data transfer based on the edge align scheme, the output data DTZ is sampled at a timing when the center of the effective window of the data (one bit of signal) synchronizes with the rising edge of the internal clock signal iCK, and the output data DTZ is then output to the exterior of the slave DPA circuit 30.

For example, the phase of the output data DTZ from the DPA circuit 30 (phase control circuit 1) is desirably shifted through approximately 90° with respect to the input data. DT with respect to the DPA circuit 30.

Thus, in the receiving semiconductor device 8, the phase of the input data DT is shifted under the control of the phase control circuit 1 to allow a plurality of signals included in the data DT to be sequentially sampled at a timing synchronized with the internal clock signal iCK.

In the present embodiment, during the period when the slave DPA circuit 30 receives data, the master DPA circuit 20 monitors the phase difference between the internal clock signal iCK and the external clock signal CK with the delay value added thereto under the control (determination process) of the phase determination control circuit 220 as shown. FIG. 6. For a detected fluctuation in the phase of the external clock signal CK, the master DPA circuit 20 adjusts the value of the delay control signal DCNT to adjust the magnitude of the delay value dd2 added to the data to be received.

Consequently, the phase control circuit 1 in the present embodiment allows the magnitude of the delay value added to the data to be sampled to track a fluctuation in the phase of the data based on the result of a tracking process for a fluctuation in the phase of the external clock signal CK which process is executed in parallel with the data sampling.

FIG. 8 is a timing chart illustrating an operation example of the phase control circuit in the semiconductor device in the present embodiment.

In FIG. 8, the axis of abscissas corresponds to time, and the axis of ordinate corresponds to the signal level.

FIG. 8 illustrates operations of a phase control circuit in a comparative example in addition to operations of the phase control circuit in the present embodiment. The phase control circuit in the comparative example controls the sampling of data by the DPA circuit using only the internal clock from the PLL circuit.

FIG. 8 indicates, with respect to an external clock signal faster than a clock signal that can be deal with based on the phase tracking characteristics of the PLL circuit, a relation between data and the clock signal when a phase of the external clock signal fluctuates.

The phase of the external clock signal CK may fluctuate during sampling of the data DT as is the case with a clock signal CKK depicted in FIG. 8. In this case, the phase of the input data DT, which is an input signal, fluctuates in conjunction with a fluctuation in the phase of the external clock signal CKK (CK).

For a delay signal dSS in the comparative example, a fluctuation of the phase of the input data DT (a delay in the signal) resulting from a fluctuation in the phase of the external clock signal CK propagates to a plurality of serially input signals. The fluctuation in the phase of the data DT is stored (superimposed) in the succeeding signal. In the comparative example, the delay value added to the input data is not substantially adjusted but is substantially constant during data reception.

Therefore, for the delay signal dSS in the comparative example, the amount of fluctuation in the phase of the signal dSS increases with progression of the signal.

As a result, in the case of the data transfer based on the edge align scheme, for the signal dSS in the comparative example, the internal clock signal iCK and the delay value may fail to track the phase differences of the external clock CKK and the data DT, making the delay signal dSS in the DPA circuit unstable at the timing for data sampling, as illustrated by a portion IDF in FIG. 8.

On the other hand, in the phase control circuit in the semiconductor device in the present embodiment, the external clock signal CKK (CK) is supplied to the master DPA circuit 20 that substantially controls the delay value dd2 for the input data. DT.

In the present embodiment, during reception of the data DT, the magnitudes of the delay values dd1 and dd2 (delay control signal DCNT) are controlled by the master DPA circuit 20 based on the phase difference between the internal clock signal iCK and the external clock signal CKK in parallel with the phase adjustment and sampling of the input data DT.

That is, the phase control circuit in the present embodiment can detect a change in the phase of the external clock CK to reflect a fluctuation in the phase of the external clock CK in a magnitude of the delay value dd2 (delay control signal DCNT).

Thus, the delay value dd2 in the slave DPA circuit 30 is constantly adjusted under the control of the master DPA circuit 20 so as to prevent the phase of the input data DT with the delay value dd2 added thereto (delay signal dS) from being excessively shifted with respect to the phase of the internal clock signal iCK even if the phases of the external clock signal CKK and the input data DT fluctuate during data reception.

For example, for a first signal Xa and a second signal Xb included in the input data DT, the delay value dd2 of a first value (z1) corresponding to the control signal DCNT is added to the first signal Xa. If the phases of the external clock signal CK (CKK) and the input data DT (dSS) fluctuate during data reception, the delay value dd2 of a second value (z2) different from the first value (z1) is added to the second signal Xb input after the first signal Xa in accordance with the control signal DCNT.

Thus, in the phase control circuit in the semiconductor device in the present embodiment, tracking of the external clock signal CK during data reception buffers a fluctuation in the phase of the input data DT (delay signal dS) loaded into the slave DPA circuit 30.

Therefore, in the semiconductor device in the present embodiment, the data input to the slave DPA circuit 30 can be prevented from being sampled in the unstable state during reception of the data DT as is the case with the delay signal dS in FIG. 8.

In the present embodiment, by the above-described operation, the data DT from the transmitting semiconductor device 9 is sequentially received by the receiving semiconductor device 8. Then, the data transfer between the semiconductor devices 8 and 9 is completed.

The data transfer in the semiconductor device in the present embodiment may be based on a center align scheme.

During the period when the slave DPA circuit 30 receives data, the master DPA circuit 20 monitors the external clock signal CK to constantly correct the value of the delay control signal DCNT (delay values dd1 and dd2). Thus, the training operation for the master DPA circuit 20 need not be executed before the slave DPA circuit 30 receives the data. DT.

(c) Effects

The configuration and operation of the phase control circuit included in the semiconductor device in the present embodiment produce the following effects.

In the phase control circuit (input circuit) in the semiconductor device in the first embodiment, the master DPA circuit 20 among the plurality of DPA circuits, is supplied with the same clock signal as the external clock signal (reference clock signal) CK provided to the PLL circuit 10.

In the present embodiment, the master DPA circuit 20 dynamically controls the magnitude of the delay value (phase shift amount) added to the data to be received, based on the determination process using the external clock signal CK from the data-transmitting semiconductor device and the internal clock signal iCK from the PLL circuit 10.

The delay value adjusted based on the external clock signal CK and the internal clock signal iCK is set in the slave DPA circuit 30 that receives the data DT by feeding the delay control signal DCNT from the master DPA circuit 20 to the plurality of slave DPA circuits 30.

Thus, even when the phase of the external clock signal or the data fluctuates during reception of the data DT, the timing for data sampling can be stabilized by controlling the delay value such that the delay value tracks the fluctuation in phase.

Figure 9:
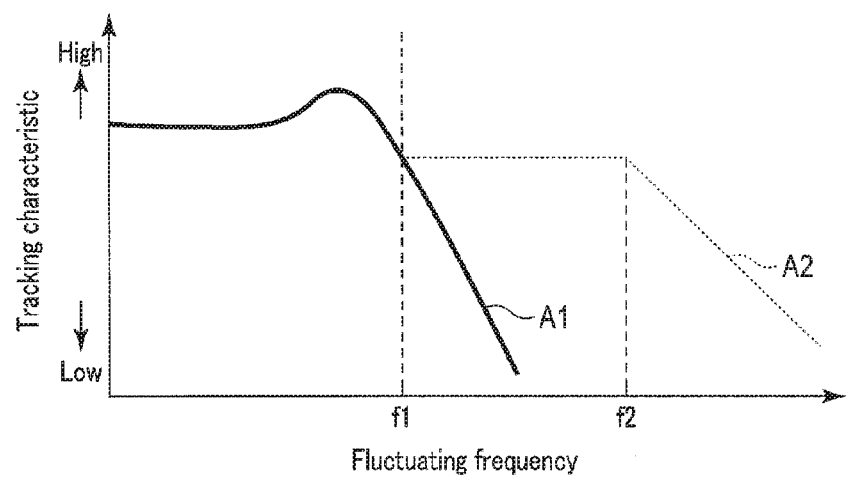
FIG. 9 is a diagram illustrating characteristics of the semiconductor device in the first embodiment.

FIG. 9 is a diagram illustrating characteristics of the phase adjustment circuit included in the semiconductor device in the present embodiment. The axis of abscissas in FIG. 9 corresponds to the fluctuation frequency of the clock signal (internal clock signal) input to the phase control circuit. The axis of ordinate in FIG. 9 corresponds to a tracking characteristic for frequency fluctuations in the PLL circuit and the DPA circuit.

In FIG. 9, a characteristic line A1 depicted by a solid line is indicative of a characteristic of the PLL circuit. In FIG. 9, a characteristic line A2 depicted by a dashed line is indicative of a characteristic of the DPA circuit.

When the sampling of the input data is controlled using only the internal clock of the PLL circuit, the adjustment of the phase of the input data is controlled in accordance with the tracking characteristic of tracking of the internal clock signal with respect to a fluctuation in the phase of the external clock signal which tracking is performed by the PLL circuit.

As depicted by a solid line A1 in FIG. 9, the characteristic of tracking of a fluctuation frequency of the PLL circuit is degraded in a region of frequencies higher than a certain frequency f1 (in FIG. 9, appropriately 1 MHz) corresponding to the characteristics of the PLL circuit (circuit design).

As a result, when a fluctuation in the phase of the external clock signal and the input data is dealt with only by the phase control for the internal clock signal performed by the PLL circuit, the data sampling synchronized with the internal clock iCK may fail to track the phase difference of the input data.

As represented by the dashed line in FIG. 9, the DPA circuit controls the delay value added to the input data to maintain a higher tracking characteristic than the PLL circuit up to a fluctuation frequency f2 (for example, approximately 10 MHz in a frequency range higher than the frequency range for the PLL circuit.

Therefore, the phase control circuit in the present embodiment can expand the range of the frequency region in which a fluctuation in phase can be tracked by a control of the phase (delay value) of the input data performed by the PLL circuit and the DPA circuit.

As a result, even when the phase of the external clock signal varies significantly during data reception, the phase control circuit in the present embodiment allows the delay value added to the input data to track the fluctuation in phase to enable stable data sampling.

Consequently, the semiconductor device in the present embodiment performs fast and accurate phase control based on the characteristics of the PLL circuit and the DPA circuit to allow suppression of data sampling errors.

Therefore, the semiconductor device in the present embodiment allows improvement of a characteristic of compensation (for example, a jitter-tolerance characteristic) for the time lag of the data (signal) to be received.

The semiconductor device in the present embodiment can deal with a dynamic phase fluctuation in the external clock signal during data sampling without the use of a complicated circuit or control method, based on the control performed by the master DPA circuit 20 using the external clock signal CK and the internal clock signal iCK.

In the present embodiment, the same signal CK as the reference clock signal for the PLL circuit 10 is used as the training data (training pattern) for the master DPA circuit 20. This enables a reduction in the supply of the training data to the slave DPA circuit 30 that receives the data and of the training operation for the slave DPA circuit 30. Therefore, in the semiconductor device in the Present embodiment, the slave DPA circuit. 30 can receive data immediately after the master DPA circuit 20 initializes the delay value.

As a result, the semiconductor device in the present embodiment enables a reduction in an operation cycle for data reception.

The external clock signal CK is used as the training data for the DPA circuit 20, and thus, the semiconductor device in the present embodiment can achieve relatively fast and accurate adjustment of the phase of the clock signal and the data based on a pattern with a high frequency of switching between "0" and "1".

As described above, the semiconductor device in the present embodiment can suppress the adverse effect of the phase difference (time lag) of the clock and data such as jitters or skews.

Therefore, the semiconductor device in the present embodiment can improve the characteristics of the data transfer.

(2) Second Embodiment

Figure 10:
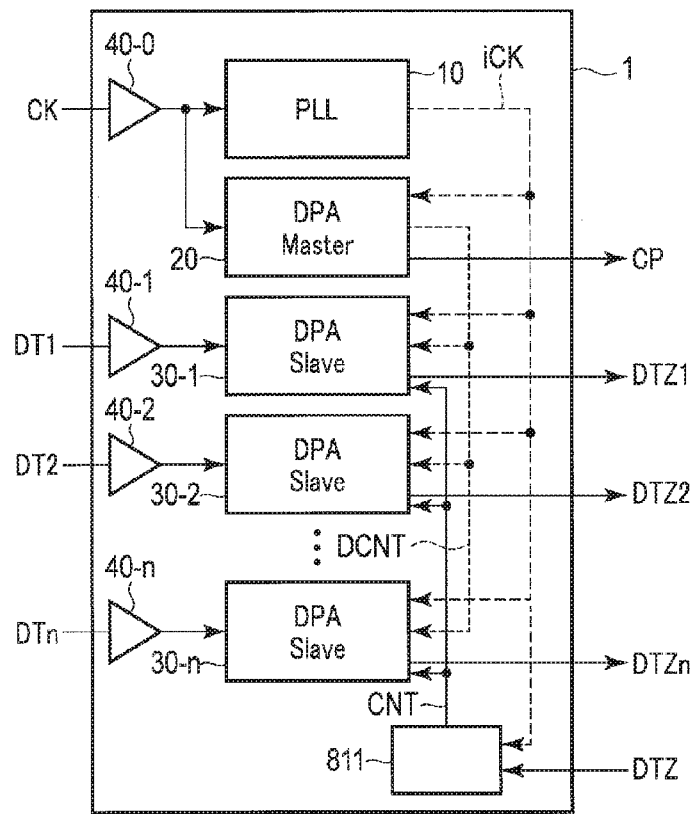
FIG. 10 is a diagram depicting a configuration example of the semiconductor device in the second embodiment.
Figure 11:
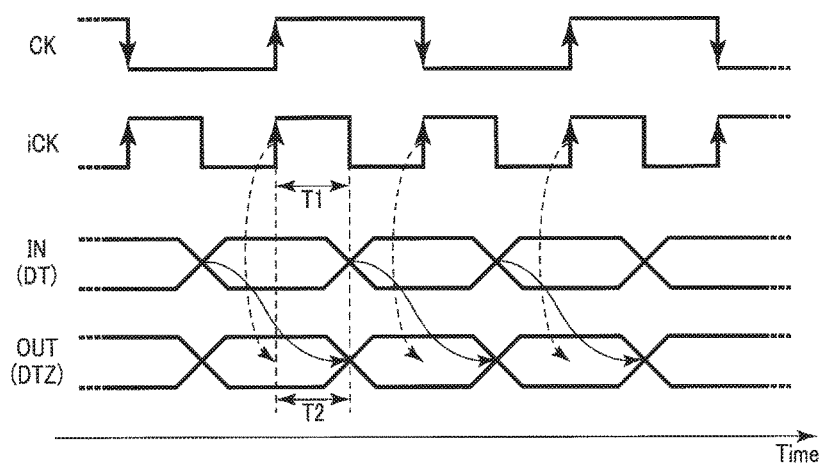
FIG. 11 is a timing chart illustrating an operation example of the semiconductor device in the second embodiment.

With reference to FIG. 10 and FIG. 11, a semiconductor device in a second embodiment will be described.

In the present embodiment, mainly differences between the semiconductor device in the second embodiment and the semiconductor device in the first embodiment will be described.

FIG. 10 is a block diagram illustrating the phase control circuit included in the semiconductor device in the second embodiment.

As depicted in FIG. 10, the phase control circuit 1 in the second embodiment is different from the phase control circuit 1 in the first embodiment in that a second control signal CNT is supplied to a plurality of the slave DPA circuits 30.

For example, the second control signal CNT is supplied to each of the slave DPA circuits 30.

The second control signal CNT is fed from a circuit (hereinafter referred to as a detection circuit) 811 to the slave DPA circuit 30.

The detection circuit 811 monitors the clock signals CK and iCK and the sampled signal DT to detect the magnitude of skew in the data DTZ output from the DPA circuit 30. Based on the result of the detection, the detection circuit 811 supplies the second control signal CNT to the slave DPA circuit 30.

For example, the detection circuit 811 may be provided in the phase control circuit 1 or outside the phase control circuit 1 (inside the interface circuit 81). Instead of an usage of the detection circuit 811, a configuration may be used in which detection of skews and supply of the control signal CNT are executed by the functions of the core circuit 80 and the interface circuit 81 based on software (firmware).

The control signal CNT is a signal (information) for an offset value corresponding to skew SK between the clock signal (internal clock signal) iCK and the data (input signal) DTZ. Based on the offset value, the value the control signal CNT is adjusted (for example, counted up or down). For example, the control signal CNT is a signal represented by a certain number of bits.

The slave DPA circuit 30 adjusts, in addition to adjustment of the delay value based on the delay control signal DCNT, the delay value added to the data DT using the supplied control signal (offset value) CNT. For clarification of description, the control signal CNT is also referred to as an offset control signal CNT.

Instead of the data DTZ, an output signal (check pattern data) CP from the master DPA circuit 20 may be used to detect the offset value. In this case, the output signal CP from the master DPA circuit 20 is supplied to the detection circuit 811.

An operation example of the semiconductor device in the second embodiment will be described using FIG. 11.

FIG. 11 is a waveform diagram (timing chart) illustrating an operation example of the semiconductor device in the second embodiment. In FIG. 11, the axis of abscissas corresponds to time, and the axis of ordinate corresponds to the signal levels of the signals.

For example, the semiconductor device 8 in the present embodiment performs data transfer in accordance with the center align scheme.

The transmitting semiconductor device 9 transmits the data DT and the external clock signal CK to the receiving semiconductor device 8 such that the center of the effective window of the input data DT aligns with the rising edge of the external clock signal CK.

The receiving semiconductor device 8 receives data at a timing when the rising edge of the internal clock signal iCK aligns with the center of the effective window of the data DT.

The semiconductor device 8 samples the data DTZ at a timing when the rising edge of the internal clock signal iCK aligns with the center of the effective window of the data. DT to output the data DTZ. In other words, a plurality of signals serially transmitted as the output data DTZ are switched at a timing between the rising edge and falling edge of the external clock signal CK.

For example, for the ideal phase difference between the input data DT and the output data DTZ in the DPA circuit 30, the phase of the output data DTZ is misaligned with the phase of the input data DT by approximately 180°.

During the data reception period, the clock signal CK and the output data DTZ are monitored by the detection circuit 811 to detect the magnitude of the value of offset (skew) between the clock signal CK and the data DTZ.

For example, the offset value corresponds to the difference (T1−T2) between a period T1 from the rising edge to falling edge of the internal clock signal iCK and a period T2 from the center of the effective window of the data to the edge of the effective window.

According to the magnitude of the detected offset value, the value of the offset control signal CNT is adjusted by the detection circuit 811. The offset control signal CNT is supplied to the delay circuit 310 in the slave DPA circuit 30.

Based on the offset value indicated in the offset control signal CNT, the magnitude of the delay value dd2 of the delay circuit 310 is adjusted. The delay circuit 310 adds the delay value dd2 based on the offset control signal CNT and the delay control signal DCNT to the data DT input to the DPA circuit 30.

As described above, the phase control circuit 1 in the semiconductor device in the present embodiment adjusts the delay value dd2 added to the input data DT according to the magnitude of possible skew between the clock signal and the data (one bit of signal).

Thus, the phase control circuit in the present embodiment can suppress the adverse effects of skews.

The control of the offset value based on skews in the present embodiment can be applied to a semiconductor device (phase control circuit) that executes the data transfer based on the edge align scheme as described in the first embodiment.

As described above, the semiconductor device in the second embodiment can produce effects similar to the effects of the first embodiment.

(3) Others

The phase control circuits (input circuits) in the semiconductor devices in the first and second embodiments can be applied not only to semiconductor devices including programmable logic circuits but also to image sensors, semiconductor memory devices (for example, flash memories), memory systems, wireless communication devices, and the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor device comprising:
   a clock generation circuit configured to receive a first clock signal and to generate a second clock signal from the first clock signal;
   a first phase adjustment circuit configured to generate a first control signal using the first clock signal and the second clock signal; and
   a second phase adjustment circuit configured to receive data and to add a first delay value based on the first control signal to the data,
   wherein the first phase adjustment circuit includes:
   a first circuit configured to add a second delay value to the first clock signal; and a second circuit configured to adjust a value of the first control signal using the first clock signal with the second delay value added thereto and the second clock signal and to output adjusted the first control signal to the second phase adjustment circuit.

2. The semiconductor device according to claim 1, wherein
a magnitude of the first delay value is adjusted based on the value of the first control signal during reception of the data.

3. The semiconductor device according to claim 1, wherein
the second circuit compares a phase of the second clock signal with a phase of the first clock signal with the second delay value added thereto to adjust the value of the first control signal.

4. The semiconductor device according to claim 1, wherein
the second circuit samples the first clock signal with the second delay value added thereto based on the second clock signal,
determines a phase difference between the first clock signal with the second delay value added thereto and the second clock signal, and
adjusts the value of the first control signal based on a determination result for the phase difference.

5. The semiconductor device according to claim 1, wherein
the second circuit outputs the first control signal to the first circuit, and
the first circuit sets the second delay value based on the first control signal.

6. The semiconductor device according to claim 1, wherein
the second phase adjustment circuit includes a third circuit configured to add the first delay value to the data, and
the third circuit sets the first delay value based on the first control signal.

7. The semiconductor device according to claim 1, wherein
the second phase adjustment circuit outputs the data with the first delay value added thereto at a timing based on the second clock signal.

8. The semiconductor device according to claim 1, wherein
a second control signal based on an offset signal for offset between the data output from the second phase adjustment circuit and the second clock signal is supplied to the second phase control circuit, and
the second phase adjustment circuit sets the first delay value based on the second control signal.

9. The semiconductor device according to claim 1, wherein
the data includes a first data bit and a second data bit succeeding the first data bit,
the first phase adjustment circuit sets the first control signal to a first value with respect to the first data bit and sets the first control signal to a second value with respect to the second data bit,
the second phase adjustment circuit adds the first delay value with a magnitude corresponding to the first value to the first data bit, and adds the first delay value with a magnitude corresponding to the second value to the second data bit.

10. The semiconductor device according to claim 9, wherein
the first value is different from the second value.

11. The semiconductor device according to claim 1, wherein
the first clock signal is used as training data for the first phase adjustment circuit.

12. The semiconductor device according to claim 1, further comprising:
a first buffer having a first input terminal to which the first clock signal is input, having a second input terminal to which an inverted signal of the first clock signal is input, and having a first output terminal connected to the clock generation circuit and the first phase adjustment circuit;
a second buffer having a third input terminal to which the data is input, having a fourth input terminal to which an inverted signal of the data is input, and having a second output terminal connected to the second phase adjustment circuit.

13. The semiconductor device according to claim 1, wherein
the second clock signal is a clock signal with a frequency resulting from multiplication of a frequency of the first clock signal.

14. The semiconductor device according to claim 1, further comprising:
a logic circuit configured to receive the data output from the second phase adjustment circuit and to enable a change in connection between a plurality of elements on a chip based on design information.

15. A semiconductor device comprising:
a first circuit configured to receive a first clock signal and to generate a second clock signal from the first clock signal during a period when data including a first data bit and a second data bit is received;
a second circuit configured to control a value of a first control signal using the first clock signal and the second clock signal; and
a third circuit configured to add a first delay value based on the first control signal to the first data bit received at a first time instant and to add a second delay value based on the first control signal to the second data bit received at a second time instant,
wherein the second circuit sets the value of the first control signal to a first value with respect to the first data bit and sets the value of the first control signal to a second value with respect to the second data bit,
the third circuit sets a magnitude of the first delay value based on the first value and sets a magnitude of the second delay value based on the second value.

16. The semiconductor device according to claim 15, wherein
a magnitude of the second delay value is different from a magnitude of the first delay value.

17. The semiconductor device according to claim 15, wherein
the second circuit controls a value of the first control signal based on a result of comparison between a phase of the first clock signal and a phase of the second clock signal.

18. The semiconductor device according to claim 15, wherein
the second circuit adds a third delay value to the first clock signal,
determines a phase difference between the first clock signal with the third delay value added thereto and the second clock signal, and controls the value of the first control signal based on a determination result for the phase difference.

19. The semiconductor device according to claim 15, wherein
a second control signal based on an offset signal for offset between the data output from the third circuit and the second clock signal is supplied to the third circuit, and
the third circuit sets the first and second delay values based on the second control signal.

* * * * *